(12) United States Patent
Ueda (10) Patent No.: US 6,541,920 B2
(45) Date of Patent: Apr. 1, 2003

(54) DC/DC CONVERTER AND SELF-LUMINOUS DISPLAY APPARATUS

(75) Inventor: Hideki Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/042,599

(22) Filed: Jan. 9, 2002

(65) Prior Publication Data

US 2002/0089290 A1 Jul. 11, 2002

(30) Foreign Application Priority Data

Jan. 9, 2001 (JP) ........................................ 2001-001217

(51) Int. Cl.[7] ............................................... H05B 37/00
(52) U.S. Cl. ..................... 315/169.3; 315/242; 315/307
(58) Field of Search .............................. 315/307, 241 R, 315/242, 243, 244, 169.3

(56) References Cited

U.S. PATENT DOCUMENTS 6,320,330 B1 * 11/2001 Haavisto et al. ............ 315/291

FOREIGN PATENT DOCUMENTS

| JP | 05064434 | 3/1993 |
|---|---|---|
| JP | 06233541 | 8/1994 |
| JP | 06-332434 | 12/1994 |
| JP | 06332434 | 12/1994 |
| JP | 08-294269 | 11/1996 |
| JP | 08294269 | 11/1996 |
| JP | 09-121534 | 5/1997 |
| JP | 09121534 | 6/1997 |
| JP | 10032977 | 2/1998 |
| JP | 11252901 | 9/1999 |
| JP | 11-252901 | 9/1999 |
| JP | 11-262250 | 9/1999 |
| JP | 11262250 | 9/1999 |
| JP | 2000-152611 | 5/2000 |
| JP | 2000152611 | 5/2000 |

* cited by examiner

*Primary Examiner*—David Vu
(74) *Attorney, Agent, or Firm*—Scully, Scott, Murphy & Presser

(57) ABSTRACT

A DC/DC converter for an electronic equipment, e.g., a self-luminous display apparatus, includes a plurality of choke coils connected in parallel to each other to a DC power supply, a control circuit for controlling the ON/OFF operation of a switching element to control an output voltage of the DC/DC converter, and a changeover switch for selectively changing over the choke coils such that only one of the choke coils which has an inductance value corresponding to the output current of the DC/DC converter is effectively connected to the rectifying diode.

14 Claims, 6 Drawing Sheets

DC/DC CONVERTER AND SELF-LUMINOUS DISPLAY APPARATUS

FIELD OF THE INVENTION

The present invention relates to a self-luminous display apparatus which includes a plurality of self-luminous pixels and a DC/DC (DC to DC: direct current to direct current) converter which can be used as a power supply for a self-luminous display apparatus of the type described and particularly to a DC/DC converter of the chopper type with which the switching loss is comparatively low.

DESCRIPTION OF THE RELATED ART

A DC/DC converter is conventionally used for various electronic equipments because it is convenient to step down or step up the voltage of a DC power supply. Particularly, a DC/DC converter of the chopper type wherein a switching element is controlled on and off to obtain a predetermined voltage is spread widely because it is advantageous in that it includes a comparatively small number of parts and is small in size, light in weight and low in cost.

Meanwhile, it is demanded that electronic apparatus in recent years be small in size and convenient for carrying. Therefore, a battery is used frequently as a power supply for the apparatus. Therefore, a DC/DC converter which can step up the voltage is used frequently for a power supply circuit provided in the apparatus. Also where a self-luminous display unit is used in a terminal of the battery driven type such as, for example, a portable telephone set, usually a DC/DC converter of the voltage step-up type is used in order to supply a sufficient voltage to a driver circuit.

Figure 3:
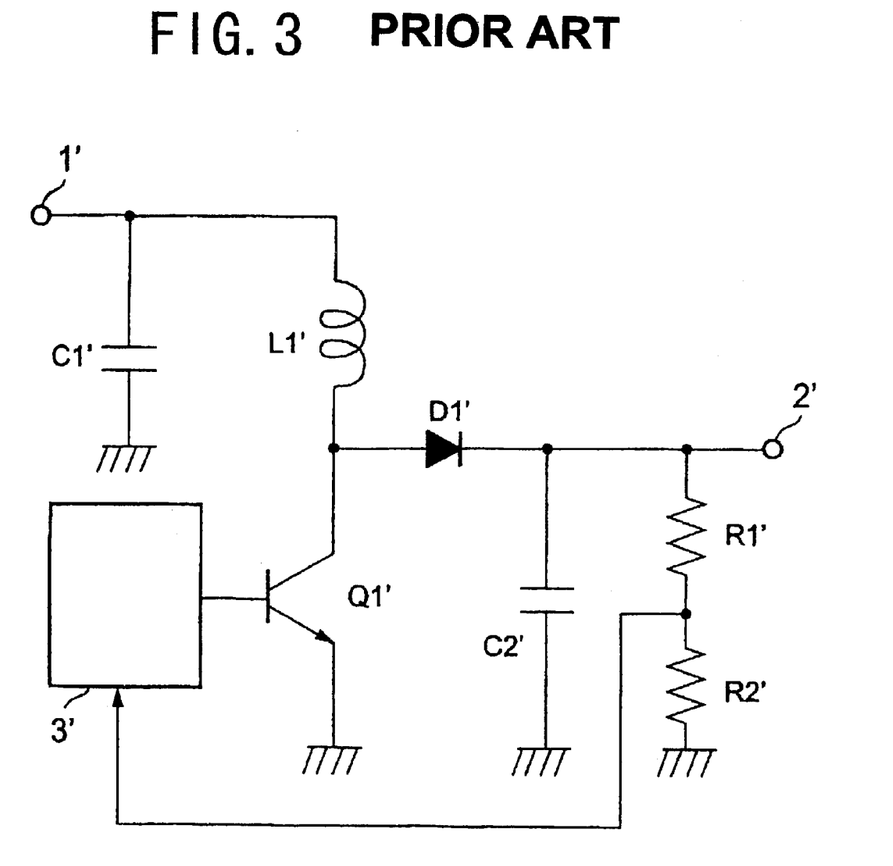
FIG. 3 is a circuit diagram showing an example of a conventional DC/DC converter.

Here, an example of a DC/DC converter conventionally used as a power supply circuit for stepping up the voltage is shown in a circuit diagram of FIG. 3. Referring to FIG. 3, a choke coil L1' and a switching transistor Q1' are connected in series between an input terminal 1' of the DC/DC converter and the ground, and a capacitor C1' for filtering is connected between the input terminal 1' and the ground. A node between the choke coil L1' and the collector of the switching transistor Q1' is connected to an output terminal 2' of the DC/DC converter through a rectifying diode D1', and a smoothing capacitor C2' is connected between the output terminal 2' and the ground. A pair of resistors R1' and R2' for voltage detection are connected in series between the output terminal 2' and the ground, and a node between the resistors R1' and R2' is connected to an input terminal of a control circuit 3'. An output (drive signal) of the control circuit 3' is connected to the base of the switching transistor Q1'.

In the circuit having the configuration described above, if an input voltage is first supplied from a DC power supply such as an external battery (not shown) to the input terminal 1', then the control circuit 3' supplies a drive signal to the switching transistor Q1'. Consequently, the switching transistor Q1' repeats on and off operations to interrupt the current between the collector and the emitter of the switching transistor Q1'. While the switching transistor Q1' is in an on state, current flows through the choke coil L1' and the choke coil L1' stores energy, but if the switching transistor Q1' is placed into an off state, then the choke coil L1' releases the energy in the form of a fly-back voltage. Thereupon, a high voltage formed from the fly-back voltage superposed on the input voltage appears at the node between the choke coil L1' and the switching transistor Q1'. The superposed voltage of the two voltages passes through the

2 rectifying diode D1' and charges the smoothing capacitor C2'. A voltage appearing between the terminals of the smoothing capacitor C2' in this manner servers as an output voltage of the power supply circuit and is supplied to an external load through the output terminal 2'. The output voltage is kept substantially fixed because the control circuit 3' supervises the divided voltage appearing at the node between the resistors R1' and R2' and varies the on-duty of the switching transistor Q1' in response to the divided voltage.

Figure 4:
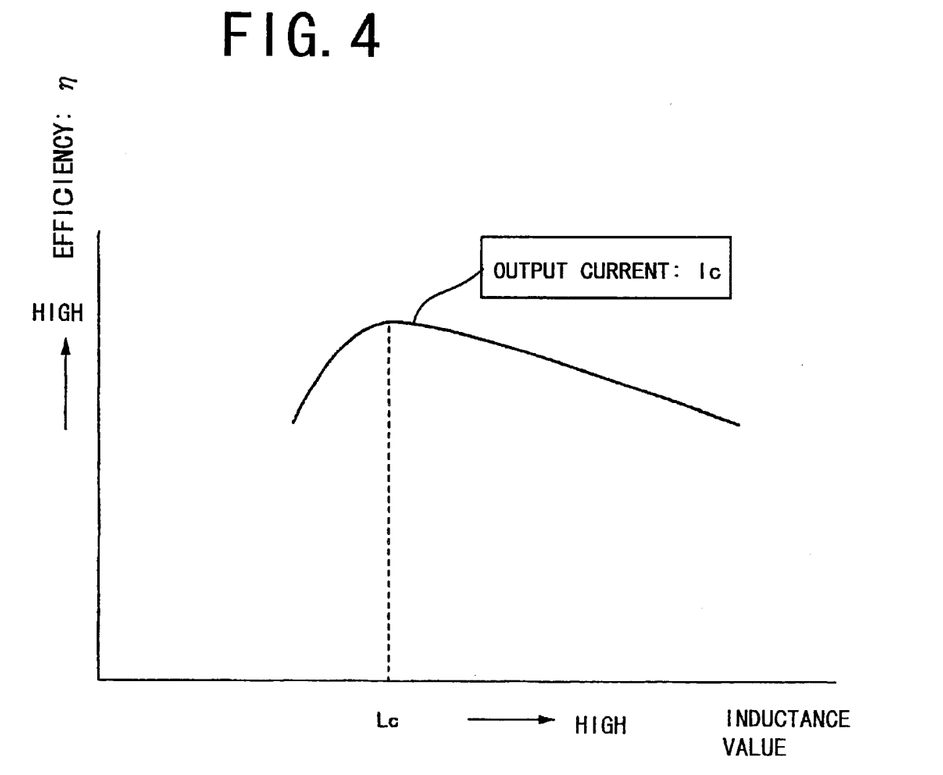
FIG. 4 is a graph illustrating a relationship between the magnitude of the inductance value of a choke coil of the DC/DC converter of FIG. 3 and the efficiency.

It is known that the conversion efficiency of the DC/DC converter relies much upon the inductance value of the choke coil L1'. FIG. 4 is a graph illustrating a relationship between the magnitude of the inductance value of the choke coil L1' which is a component of the DC/DC converter and the efficiency of the DC/DC converter. When the output current of the DC/DC converter has a predetermined value Ic, the efficiency varies in response to the inductance value of the coil and exhibits a maximum efficiency at an inductance value Lc in FIG. 4. When a DC/DC converter is designed, a single choke coil having an inductance value with which the conversion efficiency is in the maximum with regard to predetermined output current corresponding to a steady state of the apparatus is determined.

A DC/DC converter developed from the circuit configuration of the type described is disclosed, for example, in Japanese Patent Laid-Open No. 252901/1999, Japanese Patent Laid-Open No. 262250/1999, Japanese Patent Laid-Open No. 2000-152611 and so forth.

Figure 5:
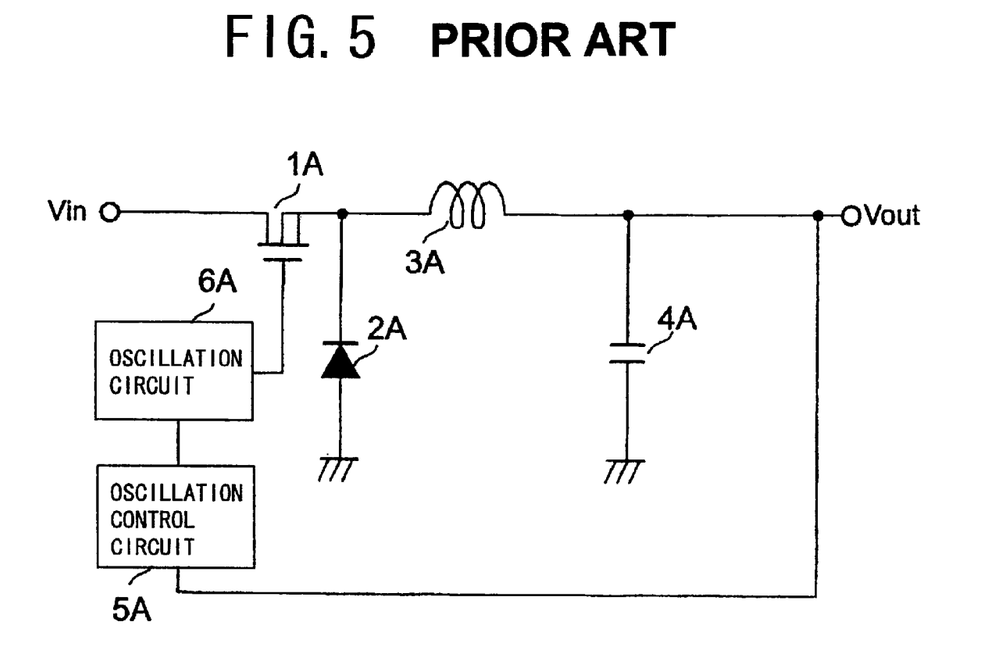
FIG. 5 is a circuit diagram showing another example of a conventional DC/DC converter.

FIG. 5 shows an example of a conventional DC/DC converter having a configuration different from those of the documents mentioned above. Referring to FIG. 5, one of terminals of a channel of a switching field effect transistor (FET) 1A is connected to an input terminal Vin of the DC/DC converter, and the cathode of a rectifying diode 2A and a choke coil 3A are connected to the other terminal of the switching FET 1A. The anode of the diode 2A is grounded, and the other terminal of the choke coil 3A is connected to an output terminal Vout of the DC/DC converter which in turn is connected to a load (not shown). The output terminal Vout is grounded through a smoothing capacitor 4A and connected to an input of an oscillation control circuit 5A. An output of the oscillation control circuit 5A is inputted to an oscillation circuit 6A, and an output (drive signal) of the oscillation circuit 6A which is controlled with the input from the oscillation control circuit 5A is connected to the gate terminal of the switching FET 1A.

The oscillation circuit 6A switches the switching FET 1A in a predetermined period. For such switching, the oscillation control circuit 5A controls the on-time of the switching FET 1A, that is, the pulse width to be applied to the gate of the switching FET 1A, so that the output voltage of the DC/DC converter may be fixed. During the on time of the FET 1A, power is stored into the choke coil 3A, but when the switching FET 1A is off, the power stored in the choke coil 3A is transmitted to the load through the rectifying diode 2A.

The output voltage of the DC/DC converter is kept fixed by controlling the on-time t of the switching FET 1A in this manner. The inductance value of the choke coil 3A is set to a value with which a stabilized oscillation operation of the oscillation circuit 6A can be achieved. A DC/DC converter developed from the circuit configuration described above is disclosed, for example, in Japanese Patent Laid-Open No. 294269/1996, Japanese Patent Laid-Open No. 121534/1997 and so forth.

Figure 6:
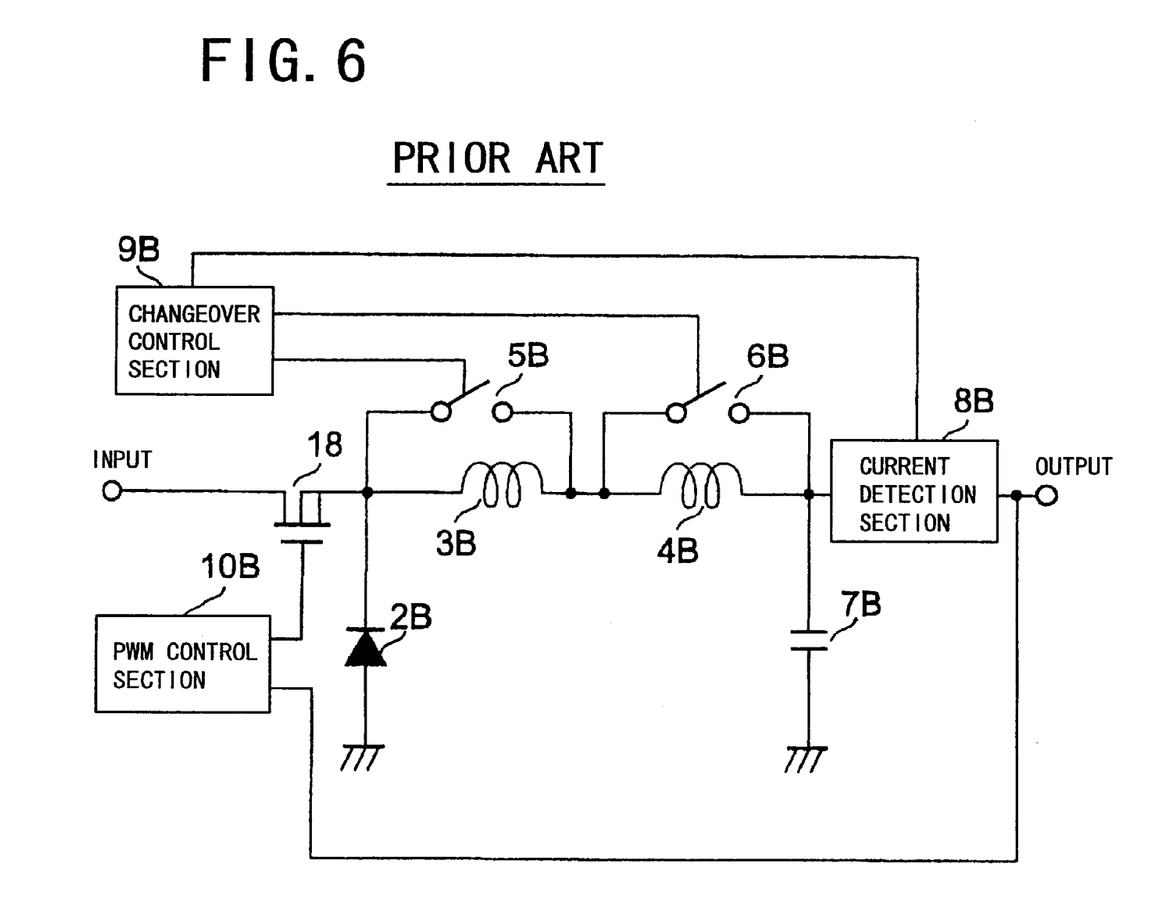
FIG. 6 is a circuit diagram showing a known DC/DC converter.

Japanese Patent Laid-Open No. 121534/1997 mentioned above, particularly in FIG. 1 thereof, discloses a DC/DC converter wherein, in order to prevent such a disadvantage that, when the load current is low, a switching FET repeats intermittent oscillations, the load current is detected and the inductance value of a choke coil is varied based on the load current. FIG. 6 shows a circuit diagram of the DC/DC converter disclosed in the document mentioned above. In FIG. 6, as reference characters, reference characters used in the document are used with the suffix B added thereto so as to facilitate recognition of a corresponding relationship.

The DC/DC converter of FIG. 6 has a basic configuration similar to that of FIG. 5. Referring to FIG. 6, the DC/DC converter shown includes a switching FET 1B, a rectifying diode 2B for transmitting power stored in a choke coil to a load when the switching FET 1B is off, a smoothing capacitor 7B, and a PWM control section 10B for controlling the on-time of the switching FET 1B, that is, the pulse width to be applied to the gate of the switching FET 1B, so that an output voltage may be fixed. The DC/DC converter includes, in addition to the components mentioned above, two choke coils 3B and 4B connected in series, a pair of switches 5B and 6B connected in parallel to the choke coils 3B and 4B, respectively, a current detection section 8B for detecting load current, and a changeover control section 9B for switching on/off the switches 5B and 6B in response to the load current to equivalently vary the entire inductance value of the choke coils 3B and 4B. In the DC/DC converter, the load current is actually detected to selectively short-circuit the choke coils connected in series to stabilize the output voltage control when the load is low. Detailed description is omitted here because they are described in Japanese Patent Laid-Open No. 121534/1997 mentioned above.

By the way, in electronic equipments in recent years, a display unit wherein a large number of display elements are arranged in a matrix is used popularly because it has a high degree of freedom in display information, and the elements are selectively driven by a column driver and a row driver to display desired information. Such a configuration as just described is hereinafter described in detail. It is to be noted that, as a prior art display apparatus of the type just described, a display apparatus is disclosed, for example, in Japanese Patent Laid-Open No. 332434/1994.

In battery-driven portable electronic equipments, an LCD (Liquid Crystal Display) unit is used frequently as a display device. Also a self-luminous display unit is often used because it has such a characteristic that it is good in visual observability. The self-luminous display unit is usually used, in equipments wherein a battery is used as a power supply, in combination with a step-up type DC/DC converter.

Since the self-luminous display unit is of the current driven type and each of pixels thereof directly emits light, it exhibits much higher current consumption than that of the other display devices of the voltage driven type such as an LCD. Further, since the current consumption of the self-luminous display unit increases in proportion to the number of pixels from which light is emitted, a great difference appears in the current consumption depending upon whether all pixels emit light or some of the pixels emit light.

Therefore, the circuit of a DC/DC converter for a power supply for a self-luminous display unit is designed and the inductance value of a coil is selected so that the DC/DC converter may exhibit a maximum efficiency when the current consumption is maximum, that is, when all pixels emit light. This gives rise to a problem that, when only some of the pixels emit light in a standby state of a portable telephone set or in a like case, the efficiency of the DC/DC converter decreases while useless power consumption increases and the standby time decreases as much.

SUMMARY OF THE INVENTION

It is an object of the present invention to provide a DC/DC converter for a self-luminous display unit by which the efficiency can always be kept high with a simple configuration irrespective of the lighting condition of the self-luminous display unit and accordingly of whether or not the current consumption of the self-luminous display unit is high and a battery for an electronic equipment such as a portable telephone set in which the self-luminous display unit is incorporated can be used for a time longer than ever.

It is an object of the present invention to provide a self-luminous display apparatus wherein a DC/DC converter used as a power supply can always operate in a high efficiency with a simple configuration irrespective of the lighting condition of the self-luminous display apparatus and accordingly of whether or not the current consumption is high and a battery for an electronic equipment such as a portable telephone set in which the self-luminous display apparatus is incorporated can be used for a time longer than ever.

In order to attain the objects described above, according to an aspect of the present invention, there is provided a DC/DC converter for being used as a power supply for a self-luminous display unit which includes a plurality of self-luminous pixels, comprising a plurality of choke coils connected in parallel to each other to a DC power supply, a rectifying diode connected commonly to the choke coils, a switching element connected to the choke coils and switched ON/OFF in a predetermined period, a control circuit for controlling the ON/OFF operation of the switching element to control an output voltage of the DC/DC converter, and changeover means for selectively changing over the choke coils such that only one of the choke coils which has an inductance value corresponding to the output current of the DC/DC converter is effectively connected to the rectifying diode. With the DC/DC converter, the efficiency can always be kept high with the simple configuration of selectively changing over the choke coils irrespective of the lighting condition of the self-luminous display unit and accordingly of whether or not the current consumption of the self-luminous display unit is high, and accordingly, a battery for an electronic equipment such as a portable telephone set in which the self-luminous display unit is incorporated can be used for a time longer than ever.

According to another aspect of the present invention, there is provided a DC/DC converter for being used as a power supply for a self-luminous display unit which includes a plurality of self-luminous pixels, comprising a series circuit of a changeover switch connected at an input terminal thereof to a DC power supply and serving as changeover means which is controlled for changing over with a changeover control signal and a plurality of choke coils having first terminals connected to corresponding ones of changeover contacts of the changeover switch and second terminals connected to each other and having inductance values different from each other, a transistor connected at a collector terminal and an emitter terminal thereof between a node between the choke coils of the series circuit and the ground, a rectifying diode having an anode terminal connected to the node between the choke coils of the series circuit, a smoothing capacitor connected between a cathode of the rectifying diode, which serves as an output terminal, and the ground, an output voltage control circuit connected to the cathode of the rectifying diode for receiving a voltage of the output terminal, and an oscillation circuit for receiving a control output from the output voltage control circuit and being connected to a base terminal of the transistor in accordance with the control output of the output voltage control circuit to vary a duty ratio of an output thereof.

In both of the DC/DC converters, where the self-luminous display unit is incorporated in a portable telephone set, preferably the changeover means is controlled such that, in response to a standby operation of the portable telephone set wherein the number of those pixels of the self-luminous display unit which emit light is set small, an optimum one of the choke coils with which a high efficiency operation suitable for the number of those pixels which currently emit light is obtained is selected. This simplifies the selection or changeover control of the choke coils.

Meanwhile, the self-luminous pixels of the self-luminous display unit may be disposed in rows and columns and driven by a column driver circuit and a row driver circuit, which are controlled by a display controller, to emit light.

According to a further aspect of the present invention, there is provided a self-luminous display apparatus, comprising a self-luminous display unit including a plurality of self-luminous pixels, a DC/DC converter serving as a power supply for supplying power to the self-luminous display unit and including a plurality of choke coils connected in parallel to each other to a DC power supply, a rectifying diode connected commonly to the choke coils, a switching element connected to the choke coils and switched ON/OFF in a predetermined period, a control circuit for controlling the ON/OFF operation of the switching element to control an output voltage of the DC/DC converter, and changeover means for selectively changing over the choke coils such that only one of the choke coils which has an inductance value corresponding to the output current of the DC/DC converter is effectively connected to the rectifying diode, and a display controller for controlling display contents of the self-luminous display unit, the display controller further controlling the changeover means so as to select only an optimum one of the choke coils of the DC/DC converter with which a high efficiency operation is obtained for current display contents.

According to a still further aspect of the present invention, there is provided a self-luminous display apparatus, comprising a self-luminous display unit including a plurality of self-luminous pixels, a DC/DC converter serving as a power supply for supplying power to the self-luminous display unit and including a series circuit of a changeover switch connected at an input terminal thereof to a DC power supply and serving as changeover means which is controlled for changing over with a changeover control signal and a plurality of choke coils having first terminals connected to corresponding ones of changeover contacts of the changeover switch and second terminals connected to each other and having inductance values different from each other, a transistor connected at a collector terminal and an emitter terminal thereof between a node between the choke coils of the series circuit and the ground, a rectifying diode having an anode terminal connected to the node between the choke coils of the series circuit, a smoothing capacitor connected between a cathode of the rectifying diode, which serves as an output terminal, and the ground, an output voltage control circuit connected to the cathode of the rectifying diode for receiving a voltage of the output terminal, and an oscillation circuit for receiving a control output from the output voltage control circuit and being connected to a base terminal of the transistor in accordance with the control output of the output voltage control circuit to vary a duty ratio of an output thereof, and a display controller for controlling display contents of the self-luminous display unit, the display controller further controlling the changeover means so as to select only an optimum one of the choke coils of the DC/DC converter with which a high efficiency operation is obtained for current display contents.

In both of the self-luminous display apparatus, where it is incorporated in a portable telephone set, preferably the changeover means is controlled such that, in response to a standby operation of the portable telephone set wherein the number of those pixels of the self-luminous display unit which emit light is set small, an optimum one of the choke coils with which a high efficiency operation suitable for the number of those pixels which currently emit light is obtained is selected. This simplifies the selection or changeover control of the choke coils.

Meanwhile, preferably the display controller selects, in response to the number of those pixels of the self-luminous display unit which are to emit light, only one of the choke coils with which a high efficiency operation is obtained for the number of those pixels which currently emit light.

Further, the self-luminous pixels of the self-luminous display unit may be disposed in rows and columns and driven by a column driver circuit and a row driver circuit, which are controlled by the display controller, to emit light.

With the DC/DC converters and the self-luminous display apparatus, when the self-luminous display unit is used, a choke coil to be used in the DC/DC converter which supplies power of a stepped up voltage to a driver circuit of the self-luminous display unit is selectively used from among a plurality of choke coils having different inductance values from each other in accordance with output current of the self-luminous display unit. Consequently, the efficiency of the DC/DC converter in any display state of the self-luminous display unit can be optimized, and the current consumption in accordance with display contents can be optimized.

Where the changeover of the choke coils is performed by the display control section in response to the number of light emitting pixels or the like, then the efficiency of the DC/DC converter can be optimized with a simple configuration without requiring a detection circuit for output current and so forth.

Also where the changeover of the choke coils is performed based on an operation state of the electronic equipment, the efficiency of the DC/DC converter can be optimized similarly with a simple configuration which does not require a detection circuit for output current or the like.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 1($a$) is a block diagram showing a configuration of a DC/DC converter to which the present invention is applied;

FIG. 1($b$) is a schematic block diagram of a self-luminous display apparatus to which the present invention and which includes a self-luminous display section as a principal component;

DESCRIPTION OF THE PREFERRED EMBODIMENT

Figure 1A:
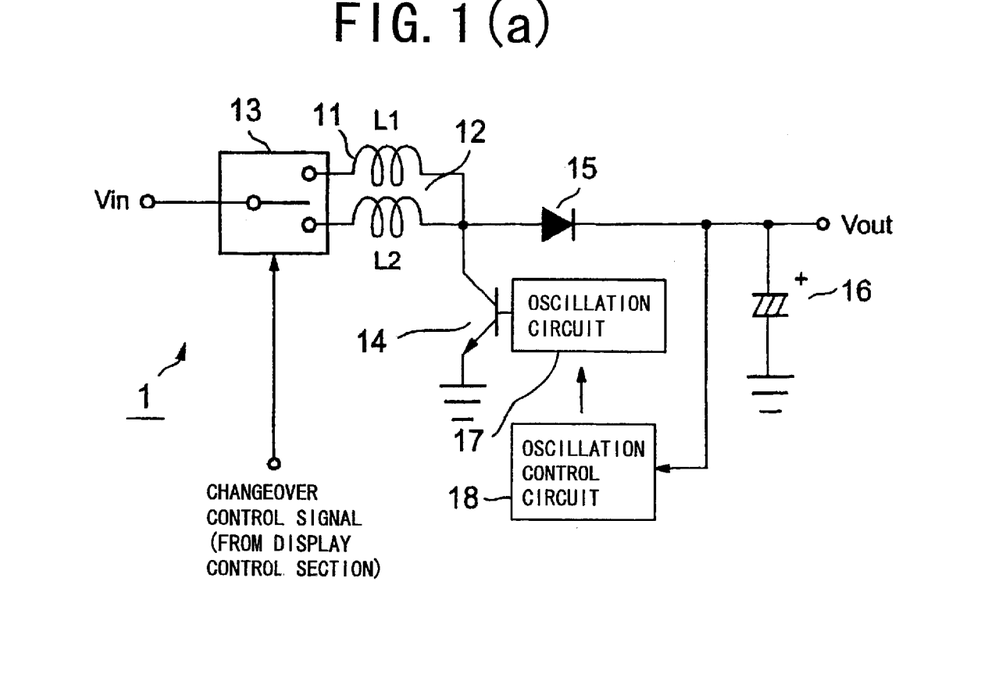
Figure 1B:
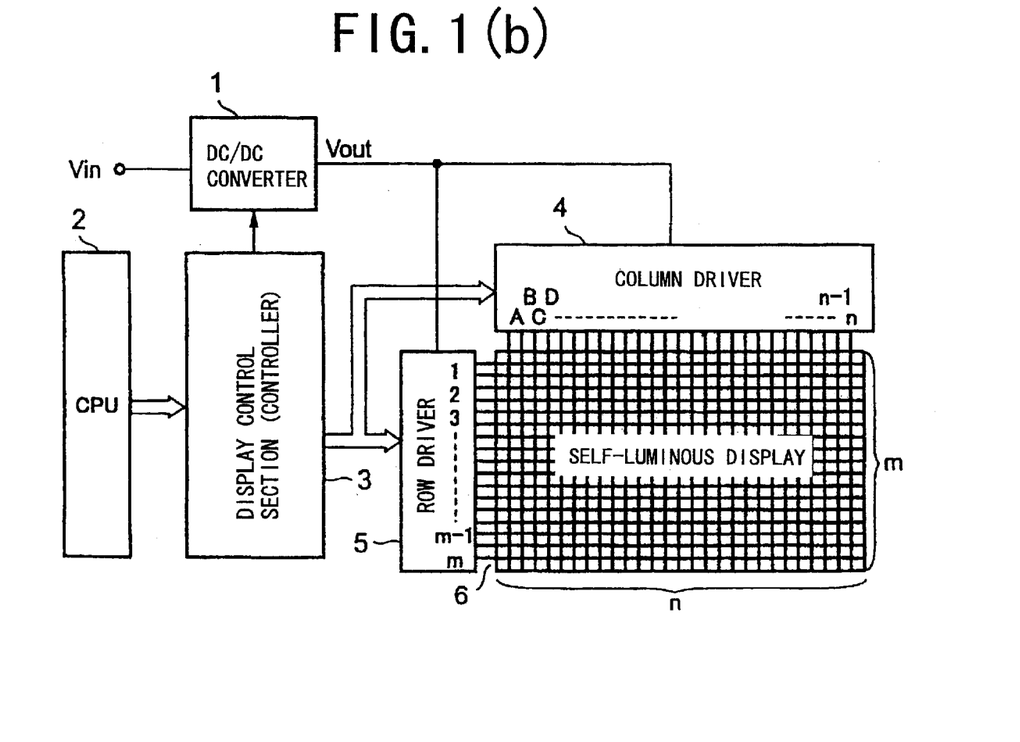

Referring to FIG. 1(b), there is shown a self-luminous display apparatus to which the present invention is applied. The self-luminous display apparatus shown includes a self-luminous display unit 6 including a plurality of pixels arranged in a matrix of m rows (1st to mth rows) and n columns (Ath to nth columns), a column driver 4 for supplying driving current for driving the pixels to emit light, a row driver 5 for generating a pull-in voltage, a display control section 3 for controlling the column driver 4 and the row driver 5 to cause necessary ones of the pixels to emit light in accordance with display contents of the display unit indicated from a CPU 2, and a DC/DC converter 1 for supplying electric power to the drivers 4 and 5.

Referring now to FIG. 1(a), there is shown a detailed configuration of the DC/DC converter 1 to which the present invention is applied. The DC/DC converter 1 includes an oscillation circuit 17 and a switching transistor 14 which performs switching ON/OFF operations in synchronism with an oscillation frequency of the oscillation circuit 17, two choke coils 11 (L1) and 12 (L2) for being selectively used to generate a stepped up voltage, a changeover switch 13 for changing over the connection of the choke coils 11 and 12, a rectifying diode 15, a smoothing capacitor 16, and an oscillation control circuit 18 for controlling an output voltage of the DC/DC converter 1.

More particularly, the DC/DC converter includes a series circuit of a changeover switch 13 serving as changeover means having one terminal connected to a DC power supply for being controlled to change over in accordance with an external changeover control signal and a plurality of choke coils 11 and 12 having first terminals connected to corresponding ones of changeover contacts of the changeover switch 13 and second terminals connected to each other and having inductance values different from each other, a switching transistor 14 serving as a switching element connected at the collector terminal and the emitter terminal thereof between the second terminals of the choke coils 11 and 12, that is, a second terminal of the series circuit, and the ground, a rectifying diode 15 having an anode terminal connected to the second terminal of the series circuit, a smoothing capacitor 16 connected between the cathode of the rectifying diode 15, which serves as an output terminal Vout, and the ground, an oscillation control circuit or output voltage control circuit 18 connected to the cathode of the rectifying diode 15 for receiving a voltage at the output terminal of the rectifying diode 15, and an oscillation circuit 17 for receiving a control output of the output voltage control circuit 18 and being connected to the base terminal of the transistor 14 in response to the received control output to vary the duty ratio of the output thereof.

Particularly, the changeover switch 13 is controlled by the display control section 3 (refer to FIG. 1(b)) outside the DC/DC converter 1 in order that it may select an optimum one of the choke coils 11 and 12 in response to the number of those pixels of the self-luminous display unit 6 which emit light to effect display and accordingly in response to output current of the DC/DC converter 1.

Figure 2:
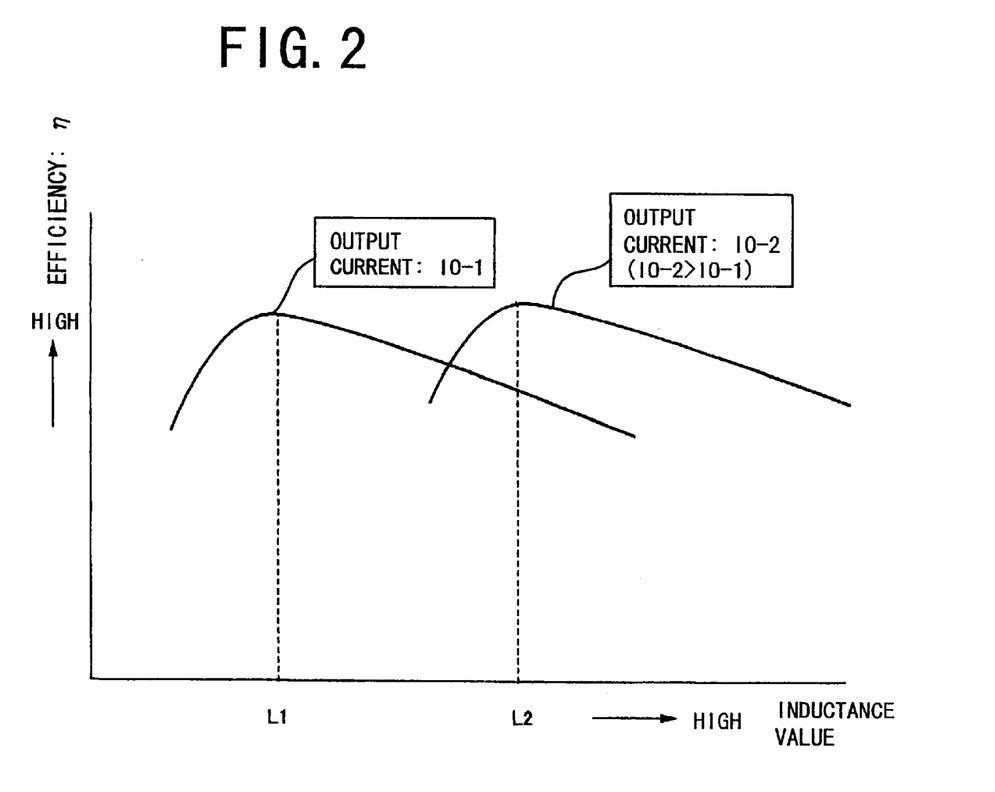
FIG. 2 is a graph illustrating a relationship between the magnitude of the inductance value of a choke coil and the efficiency where the DC/DC converter of FIG. 1(a) exhibits different output currents.

The choke coils 11 and 12 mentioned above are described. FIG. 2 illustrates a relationship between the magnitude of the inductance values of the choke coils which are components of the DC/DC converter 1 and the efficiency in different output currents (IO-1 and IO-2 where IO-1<IO-2) of the DC/DC converter 1 of FIG. 1(a). Referring to FIG. 2, a curve IO-1 represents the relationship mentioned above when the DC/DC converter 1 outputs fixed output current while the number of those pixels which emit light is small in the self-luminous display apparatus of FIG. 1(b), and another curve IO-2 represents the relationship mentioned above when the DC/DC converter 1 outputs fixed output current while all of the light emitting pixels emit light. Here, the output currents have a relationship of IO-1<IO-2. It can be seen that, the inductance value of the coils with which the efficiency is maximum varies depending upon the output current of the DC/DC converter 1, and an inductance value L1 provides a maximum efficiency in the case of the output current IO-1, but another higher inductance value L2 provides a maximum efficiency in the case of the output current IO-2. In the DC/DC converter 1, the choke coils 11 and 12 have the inductance values L1 and L2, respectively.

Referring back to FIG. 1(b), the self-luminous display apparatus includes the DC/DC converter 1 described above and a well-known self-luminous display section. The self-luminous display section in turn includes the CPU 2, the display control section (controller) 3 connected to the CPU 2, the column driver 4 and the row driver 5 connected to the display control section 3, and the self-luminous display unit 6 including a large number of self-luminous elements disposed in a matrix for being driven with outputs of the column driver 4 and the row driver 5. The DC/DC converter 1 supplies power to the column driver 4 and the row driver 5, and an output of the display control section 3 described above is inputted to the DC/DC converter 1.

Now, operation of the self-luminous display apparatus is described. First, a light emitting operation of the self-luminous display unit 6 is described. The CPU 2 signals predetermined display information to the controller 3. The controller 3 controls the column driver 4 and the row driver 5 so that necessary pixels may emit light in accordance with the received display information.

For example, in order to cause the pixel A-1 (pixel in the column A and the row 1, this similarly applies to the following description) of the self-luminous display unit 6 to emit light, the column driver 4 turns ON the line A, that is, applies a positive voltage to the line A. Meanwhile, the row driver 5 turns ON the line 1, that is, applies a negative voltage to the line 1. Consequently, in the pixel A-1, current flows from the line A (column driver) side to the line 1 (row driver) side due to the diode characteristic, whereupon the pixel A-1 emits light. Similarly, in order to cause the pixel B-2 to emit light, the line B is turned ON by the column driver 4 and the line 2 is turned ON by the row driver.

While the column driver 4 keeps a predetermined line ON, the rowdriver 5 selectively turns ON those lines which correspond to those pixels which are to emit light, and the column driver 4 scans the lines to successively turn them ON while the row driver 5 turns ON those lines designated for each column in response to the scanning so that predetermined pixels on the display unit emit light to represent desired display contents on the display unit.

In the self-luminous display apparatus of FIG. 1(b), the display control section 3 discriminates whether or not the number of pixels instructed to emit light is great together with the displaying operation described above. Then, when the light emitting pixel number of the self-luminous display unit 6 is great, that is, when the output current of the DC/DC converter 1 is high, the display control section 3 controls the changeover switch 13 of the DC/DC converter 1 of FIG. 1(a), which supplies electric power to the column driver 4 and the row driver 5, to select the choke coil 12.

On the other hand, when the light emitting pixel number of the self-luminous display unit 6 is small, that is, when the output current of the DC/DC converter 1 is low, the display control section 3 controls the changeover switch 13 to select the choke coil 11. Here, the inductance values of the choke coils 11 and 12 have the relationship of choke coil 12>choke coil 11 and are optimized so that the efficiency may be substantially maximum in a state wherein only the choke coil 12 is connected (selected) when the output current of the DC/DC converter 1 is high, but in another state wherein only the choke coil 11 is connected when the output current is low (refer to FIG. 2).

Since selective determination of the choke coil (inductance value) to be selected is performed by the display control section 3 which controls display and the DC/DC converter 1 is controlled based on the selective determination in this manner, an additional configuration for detecting output current of the DC/DC converter is not required at all, and improvement of the efficiency (prevention of a low efficiency) of a DC/DC converter circuit is achieved by switchably selecting a choke coil suitable for output current of the DC/DC converter section without increasing the circuit scale and without increasing the power consumption when compared with a conventional DC/DC converter.

In the DC/DC converter 1 described above, two choke coils are changed over. Naturally, however, a greater number of choke coils may otherwise be provided in the DC/DC converter such that the display control section selects an optimum inductance in accordance with the number of display elements to emit light.

Further, the basic configuration of the DC/DC converter is not limited to that described with reference to FIG. 1, but such a configuration as described hereinabove with reference to FIG. 5 can be applied similarly. In summary, the present invention can be applied to a DC/DC converter for a self-luminous display unit, which uses a choke coil, to improve the efficiency of the DC/DC converter only if the conversion efficiency of the choke coil of the DC/DC converter varies depending upon the output current of the DC/DC converter.

The self-luminous display apparatus described above with reference to FIG. 1(b) can be suitably applied in a portable telephone set. Where the self-luminous display apparatus is applied in a portable telephone set, the control signal used for changing over of the changeover switch 13 (refer to FIG. 1(a)) is derived from an element of the portable telephone set other than the display control section 3.

The self-luminous display apparatus of the portable telephone set is configured in the following manner. In particular, when the portable telephone set is in a standby state, the number of those pixels of the display unit 6 which are to emit light is suppressed to a necessary but minimum one in order to minimize current consumption. Thus, for example, only a reception electric field, a clock and an indication of whether or not use of the portable telephone set is possible are displayed. Further, the inductance value of one of the choke coils is determined so that the efficiency of the DC/DC converter may be optimum in the standby state. Further, supposing that all pixels are used to emit light for displaying when the portable telephone set is in an operating state, the inductance value of the other choke coil is determined so that the efficiency of the DC/DC converter may be optimum with output current in this state. Thus, for example, in response to an instruction from a CPU which controls the entire portable telephone set, changeover of the inductance value of the DC/DC converter is performed depending upon whether the portable telephone set is in the standby state or in the operating state.

In the portable telephone set described above, the CPU thereof issues an instruction to change over the choke coils of the CD/CD converter when it is in the standby state. However, the portable telephone set may otherwise be configured such that an output signal from a suitable part which by itself can discriminate the standby state can be used to instruct the CD/CD converter to change over the choke coils.

Further, in the self-luminous display apparatus described above with reference to FIG. 1(b), the number of display pixels which actually emit light is discriminated by the display control section which controls display, that is, light emission. However, where it is known in advance that operation states of an equipment can be divided roughly into those as in a standby state and in a communication state and one of the states involves a comparatively small amount of display contents of the display unit as in the portable telephone set described above, also the equipment which may be other than the portable telephone set can be configured such that changeover of the choke coils used in the DC/DC converter is performed in accordance with an instruction from any other element than the display control section. Also in this instance, similar effects to those of the self-luminous display apparatus can be achieved.

While the present invention can be applied not only to portable telephone sets but also widely to electronic equipments which use a self-luminous display unit, since a portable telephone set which uses a self-luminous display unit is driven with a battery and requires a DC/DC converter for a display section and therefore has a standby state (power saving mode) in a high ratio, it can be listed as one of the best equipments to which the present invention can be applied.

While a preferred embodiment of the present invention has been described using specific terms, such description is for illustrative purposes only, and it is to be understood that changes and variations may be made without departing from the spirit or scope of the following claims.

What is claimed is:

1. A DC/DC converter for being used as a power supply for a self-luminous display unit which includes a plurality of self-luminous pixels, comprising:
   a plurality of choke coils connected in parallel to each other to a DC power supply;
   a rectifying diode connected commonly to said choke coils;
   a switching element connected to said choke coils and switched ON/OFF in a predetermined period;
   a control circuit for controlling the ON/OFF operation of said switching element to control an output voltage of said DC/DC converter; and
   changeover means for selectively changing over said choke coils such that only one of said choke coils which has an inductance value corresponding to the output current of said DC/DC converter is effectively connected to said rectifying diode.

2. A DC/DC converter as claimed in claim 1, wherein, where said self-luminous display unit is incorporated in a portable telephone set, said changeover means is controlled such that, in response to a standby operation of said portable telephone set wherein the number of those pixels of said self-luminous display unit which emit light is set small, an optimum one of said choke coils with which a high efficiency operation suitable for the number of those pixels which currently emit light is obtained is selected.

3. A DC/DC converter as claimed in claim 1, wherein said self-luminous pixels of said self-luminous display unit are disposed in rows and columns and driven by a column driver circuit and a row driver circuit, which are controlled by a display controller, to emit light.

4. A DC/DC converter for being used as a power supply for a self-luminous display unit which includes a plurality of self-luminous pixels, comprising:
   a series circuit of a changeover switch connected at an input terminal thereof to a DC power supply and serving as changeover means which is controlled for changing over with a changeover control signal and a plurality of choke coils having first terminals connected to corresponding ones of changeover contacts of said changeover switch and second terminals connected to each other and having inductance values different from each other;
   a transistor connected at a collector terminal and an emitter terminal thereof between anode between said choke coils of said series circuit and the ground;
   a rectifying diode having an anode terminal connected to the node between said choke coils of said series circuit;
   a smoothing capacitor connected between a cathode of said rectifying diode, which serves as an output terminal, and the ground;
   an output voltage control circuit connected to the cathode of said rectifying diode for receiving a voltage of said output terminal; and
   an oscillation circuit for receiving a control output from said output voltage control circuit and being connected to a base terminal of said transistor in accordance with the control output of said output voltage control circuit to vary a duty ratio of an output thereof.

5. A DC/DC converter as claimed in claim 4, wherein, where said self-luminous display unit is incorporated in a portable telephone set, said changeover means is controlled such that, in response to a standby operation of said portable telephone set wherein the number of those pixels of said self-luminous display unit which emit light is set small, an optimum one of said choke coils with which a high efficiency operation suitable for the number of those pixels which currently emit light is obtained is selected.

6. A DC/DC converter as claimed in claim 4, wherein said self-luminous pixels of said self-luminous display unit are disposed in rows and columns and driven by a column driver circuit and a row driver circuit, which are controlled by a display controller, to emit light.

7. A self-luminous display apparatus, comprising:
   a self-luminous display unit including a plurality of self-luminous pixels;
   a DC/DC converter serving as a power supply for supplying power to said self-luminous display unit and including a plurality of choke coils connected in parallel to each other to a DC power supply, a rectifying diode connected commonly to said choke coils, a switching element connected to said choke coils and switched ON/OFF in a predetermined period, a control circuit for controlling the ON/OFF operation of said switching element to control an output voltage of said DC/DC converter, and changeover means for selectively changing over said choke coils such that only one of said choke coils which has an inductance value corresponding to the output current of said DC/DC converter is effectively connected to said rectifying diode; and
   a display controller for controlling display contents of said self-luminous display unit, said display controller further controlling said changeover means so as to select only an optimum one of said choke coils of said DC/DC converter with which a high efficiency operation is obtained for current display contents.

8. A self-luminous display apparatus as claimed in claim 7, wherein said self-luminous display apparatus is incorporated in a portable telephone set, and said changeover means is controlled such that, in response to a standby operation of said portable telephone set wherein the number of those pixels of said self-luminous display unit which emit light is set small, an optimum one of said choke coils with which a high efficiency operation suitable for the number of those pixels which currently emit light is obtained is selected.

9. A self-luminous display apparatus as claimed in claim 7, wherein said display controller selects, in response to the number of those pixels of said self-luminous display unit which are to emit light, only one of said choke coils with which a high efficiency operation is obtained for the number of those pixels which currently emit light.

10. A self-luminous display apparatus as claimed in claim 7, wherein said self-luminous pixels of said self-luminous display unit are disposed in rows and columns and driven by a column driver circuit and a row driver circuit, which are controlled by said display controller, to emit light.

11. A self-luminous display apparatus, comprising:
   a self-luminous display unit including a plurality of self-luminous pixels;
   a DC/DC converter serving as a power supply for supplying power to said self-luminous display unit and including a series circuit of a changeover switch connected at an input terminal thereof to a DC power supply and serving as changeover means which is controlled for changing over with a changeover control signal and a plurality of choke coils having first terminals connected to corresponding ones of changeover contacts of said changeover switch and second terminals connected to each other and having inductance values different from each other, a transistor connected at a collector terminal and an emitter terminal thereof between a node between said choke coils of said series circuit and the ground, a rectifying diode having an anode terminal connected to the node between said choke coils of said series circuit, a smoothing capacitor connected between a cathode of said rectifying diode, which serves as an output terminal, and the ground, an output voltage control circuit connected to the cathode of said rectifying diode for receiving a voltage of said output terminal, and an oscillation circuit for receiving a control output from said output voltage control circuit and being connected to a base terminal of said transistor in accordance with the control output of said output voltage control circuit to vary a duty ratio of an output thereof; and
   a display controller for controlling display contents of said self-luminous display unit, said display controller further controlling said changeover means so as to select only an optimum one of said choke coils of said DC/DC converter with which a high efficiency operation is obtained for current display contents.

12. A self-luminous display apparatus as claimed in claim 11, wherein said self-luminous display apparatus is incorporated in a portable telephone set, and said changeover means is controlled such that, in response to a standby operation of said portable telephone set wherein the number of those pixels of said self-luminous display unit which emit light is set small, an optimum one of said choke coils with which a high efficiency operation suitable for the number of those pixels which currently emit light is obtained is selected.

13. A self-luminous display apparatus as claimed in claim 11, wherein said display controller selects, in response to the number of those pixels of said self-luminous display unit which are to emit light, only one of said choke coils with which a high efficiency operation is obtained for the number of those pixels which currently emit light.

14. A self-luminous display apparatus as claimed in claim 11, wherein said self-luminous pixels of said self-luminous display unit are disposed in rows and columns and driven by a column driver circuit and a row driver circuit, which are controlled by said display controller, to emit light.

* * * * *